(12) United States Patent
Cui et al.

(10) Patent No.: US 6,681,838 B2
(45) Date of Patent: Jan. 27, 2004

(54) LIQUID-SOLID ROLLING BONDING METHOD FOR DIFFERENT KINDS OF METALS AND THE APPARATUS THEREFOR

(75) Inventors: Jianzhong Cui, Shenyang (CN); Xiaobo Zhang, Shenyang (CN); Guimin Lu, Shenyang (CN); Guangming Xu, Shenyang (CN)

(73) Assignees: Northeastern University, Shenyang (CN); Anshanshi Sanhe Clad Metal Plates Manufacturing Co., Ltd., Anshan (CN)

( * ) Notice: Subject to any disclaimer, the term of this patent is extended or adjusted under 35 U.S.C. 154(b) by 0 days.

(21) Appl. No.: 09/885,786

(22) Filed: Jun. 19, 2001

(65) Prior Publication Data

US 2002/0069998 A1 Jun. 13, 2002

(30) Foreign Application Priority Data

Jun. 19, 2000 (CN) .......................... 00109241 A

(51) Int. Cl.[7] .......................... B22D 11/00; B22D 19/08
(52) U.S. Cl. .......................... 164/461; 164/102
(58) Field of Search .......................... 164/461, 98, 101, 164/102, 103

(56) References Cited

U.S. PATENT DOCUMENTS 4,321,289 A * 3/1982 Bartsch ...................... 118/101
4,953,612 A * 9/1990 Sare et al. ................... 164/102
5,053,286 A * 10/1991 Pratt et al. .................... 148/415

FOREIGN PATENT DOCUMENTS

JP 62-28059 * 2/1987

* cited by examiner

Primary Examiner—Kuang Y. Lin
(74) Attorney, Agent, or Firm—Blakely, Sokoloff, Taylor & Zafman LLP

(57) ABSTRACT

The present invention relates to a liquid-solid rolling bonding method for heterogeneous metals and an apparatus therefor. The method comprises: pouring a liquid metal onto the surface of a heterogeneous solid base metal coated with a soldering flux; rolling the liquid metal and the solid metal under pressure; solidifying the liquid metal and making it bond to the surface of the solid base metal under rapid cooling to realize metallurgical bonding of the two or more metals. The apparatus comprises an unrolling machine, a soldering flux tank, a drying-heating apparatus, a pouring nozzle, an interior water-cooling rollers and a roll-collecting machine arranged in order, a pouring basket is disposed above the pouring nozzle and a base frame is disposed below the pouring nozzle. The present invention has the advantages of high bonding strength, lower production cost, high production efficiency, good product quality, fewer investment for the apparatus and lower consumption of energy. The method of the present invention can replace the convention rolling bonding method in solid-solid phase and is suitable for the production of various clad metal sheets and strip.

5 Claims, 5 Drawing Sheets

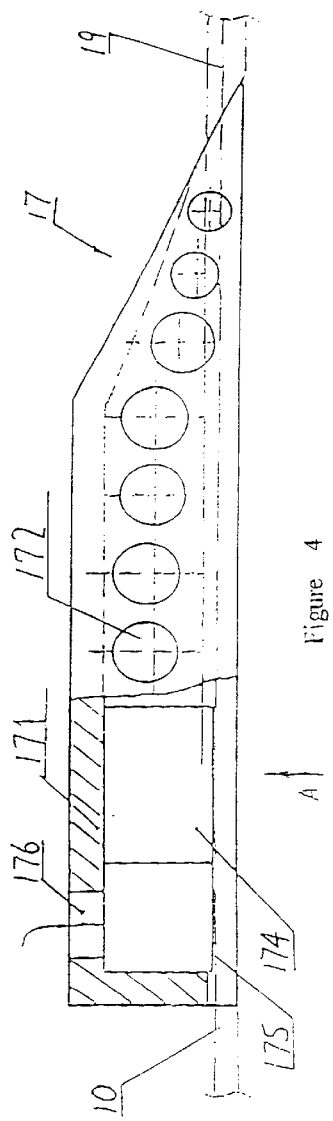
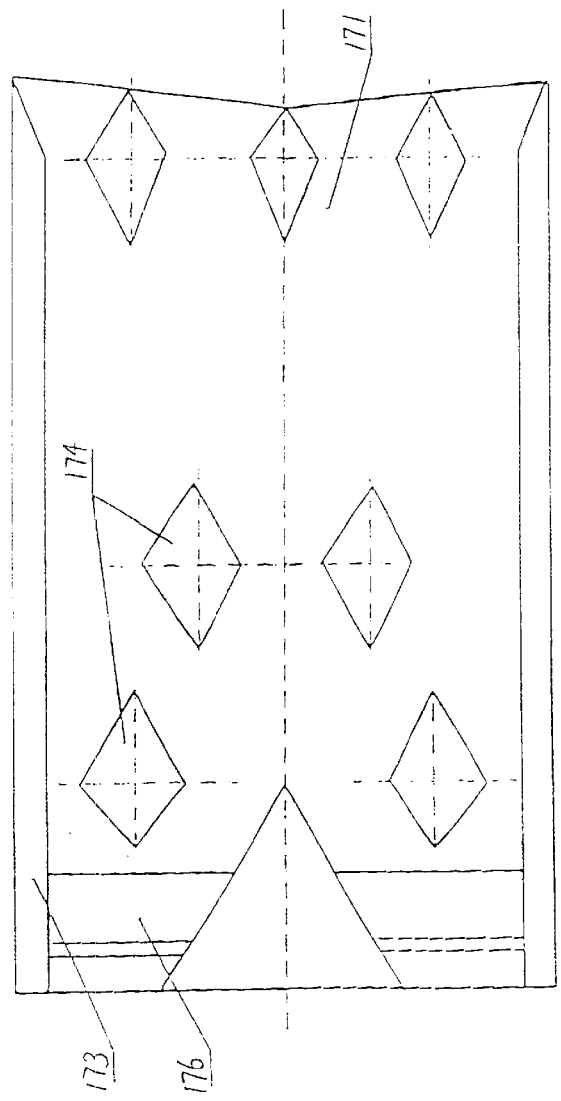

LIQUID-SOLID ROLLING BONDING METHOD FOR DIFFERENT KINDS OF METALS AND THE APPARATUS THEREFOR

FIELD OF THE INVENTION

The present invention relates to a rolling bonding method for different kinds of metals and the apparatus therefor, especially, to a liquid-solid rolling bonding method for different kinds of metals and the apparatus therefor.

BACKGROUND OF THE INVENTION

Clad metal sheet is a kind of new material formed by integrating two or more heterogeneous metals under the function of high temperature and high pressure. According to the requirements of the design, it can fully combine the advantages of each of the components. It also has many other advantages, such as low cost and high combination property, good mechanical, physical and chemical engineering properties including high strength, abrasive resistance, corrosion resistance etc. So it is widely used in architecture and mechanical industries, for making cookers and tableware, furniture, chemical industry decoration, automobile industry space flight, aviation etc.

The methods for making clad metal sheets are divided into five kinds: rolling bonding method, powder rolling method, explosion bonding method, clad casting method and spraying plating method.

Rolling bonding method, which is divided into hot rolling bonding method and cold rolling bonding method as disclosed by U.S. Pat. No. 3,545,943, is the most widely adopted method for making clad metal sheets. The realization of the method depends on the physical contact of new surfaces arising from the extension during rolling, so the reduction percentage at the first step must be high enough (ordinarily more than 50%). The method needs a huge rolling mill to generate a great rolling force and it also relies on annealing which follows the rolling process to realize metallurgical bonding. However, the bonding strength is still low. In recent years, there are some developments in this field. For example, continuous rolling bonding, asynchronous rolling bonding, differential temperature rolling bonding have been developed. However, the problems such as great investment of apparatus, high dissipation of energy and high cost have not been solved completely.

JPJ8667705A (1984), JAJ54124804 (1981) and JAJ8021518 (1984) and U.S. Pat. No. 4,308,321 (1981) disclose a powder rolling bonding method for heterogeneous metals. The method is to scatter a metal powder onto a solid metal and to sinter them under a protective atmosphere, then to roll them to form a clad metal sheet. This method has the shortcomings of complex procedures, long flow path and high consumption of energy. This method is only suitable for making some special clad metal sheets, such as the bearing clad strip made of copper-lead alloy and steel.

Bradgessky (Please refer to "Explosion Meld Forming And Compression" written by Bradgessky and translated by Fule Li, Mechanical Industry Press, 1988, P78) disclosed an explosion bonding method. The method is to utilize jet flows arising from the explosion to clean the surface and to utilize the impact force and instantaneous high temperature arising from the explosion to realize bonding. The method is simple and economical. However, it is only suitable for making thick clad metal sheets. Moreover, it has high demands on production site and the production can not be continuously.

U.S. Pat. No. 3,495,649 (1970) disclosed a clad casting method. This method is to cast a molten metal on the surface of a solid base material to realize metallurgical bonding. This method is relatively simple and it can be used to produce work-blanks and components. However, the surface of the base metal is ready to be oxidized, thus it is necessary to treat the work-blanks before they are processed to form the final product. Furthermore, the final product has strong interface residual stress and does not have enough bonding strength. Moreover, the cost of the method is high.

U.S. Pat. No. 4,333,775 (1982), GB159861 (1977), JAJ8019522 (1978) and DT2928317 (1978) disclosed a spraying plating method. This method is to spray a hot molten metal alloy onto a solid steel plate by using a spray lance. The advantage of this method is that there is no segregation in the components of the alloy due to the rapid cooling procedure during spraying. Since the molten metal is ready to be oxidized when being sprayed, the final metal has low bonding strength. Moreover, the apparatus of the method is complicated and the investment is relatively high.

Therefore, the key to the development of clad metal is to look for a more economical and efficient manufacturing method with more simple procedures.

OBJECTIVE OF THE INVENTION

One object of the present invention is to provide a liquid-solid rolling bonding method for different kinds of metals to overcome the disadvantages of the prior art and to produce a clad metal sheet with high bonding strength, simple procedures and high economic efficiency.

Another object of the present invention is to provide an apparatus for carrying out the above-mentioned a liquid-solid rolling bonding method for different kinds of metals.

SUMMARY OF THE INVENTION

The present invention discloses a liquid-solid rolling bonding method for different kinds of metals and an apparatus to carry out the method of the present invention. The method of the present invention comprises the following steps: pouring a molten (liquid) metal onto the surface of a heterogeneous solid base metal coated with a soldering flux, and rolling these two metals under pressure to make the molten metal solidified and bond to the surface of the solid base metal under rapid cooling. Thus, the method of the present invention realizes the metallurgical bonding of two or more metals.

The present invention also discloses an apparatus for carrying out the method of the present invention. The apparatus for carrying out the method invention comprises an unwinding machine, a soldering flux tank, a heating-drying apparatus, a pouring nozzle, an interior water-cooling roller and a roll-collecting machine arranged in order. A pouring basket is disposed above the pouring nozzle and a base frame is disposed below the pouring nozzle.

BRIEF DESCRIPTION OF THE DRAWINGS

FIG. 4 is the structural drawing of the pouring nozzle of the apparatus shown in FIG. 3.

FIG. 5 is the side view of FIG. 4 from direction A, showing the setting mode of pressing-blocks disposed in the pouring nozzle.

DETAILED DESCRIPTION OF THE INVENTION

According to one aspect of the present invention, it provides a liquid-solid rolling bonding method for different kinds of metals. The method comprises the following steps: pouring a molten metal onto the surface of a heterogeneous solid with a soldering flux; rolling these two metals under pressure; making the molten metal solidified and bonded to the surface of the solid base metal under rapid cooling to realize the metallurgical bonding of two or more metals.

Figure 1:
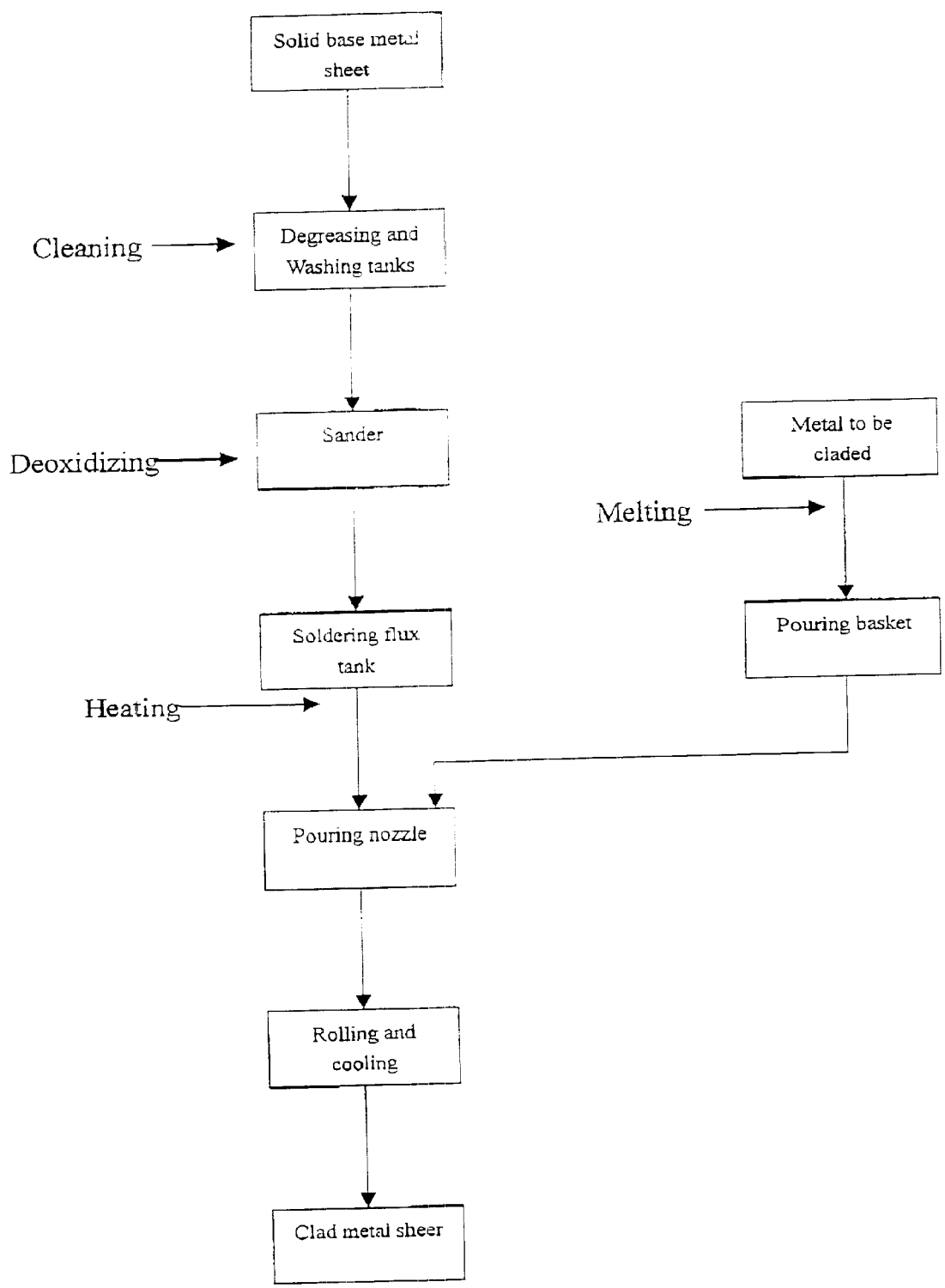
FIG. 1 is the process flow diagram of the method of the present invention.

FIG. 1 shows the process flow diagram of the method of the present invention. As is shown by FIG. 1, the liquid-solid rolling bonding method for different kinds of metals comprises of the following steps:

(1) cleaning: cleaning the surface of the solid base metal to remove the oil stain and other impurities;

(2) sanding: sanding the cleaned surface to remove the oxides existed on the surface of the solid base metal;

(3) coating a soldering flux: coating a layer of a soldering flux on the surface of the base metal after the above-mentioned cleaning and sanding procedures;

(4) heating: heating the solid base metal which has been coated a soldering flux to a predetermined temperature and sending it to the pouring nozzle;

(5) pouring-rolling bonding: melting the metal to be clad into liquid and pouring the liquid metal into a pouring basket; pouring the liquid metal onto the surface of the solid base metal through the pouring nozzle with press blocks and an inlet for the liquid metal when the solid base metal being sent into the pouring nozzle to make the liquid metal contact and wet the surface of the solid base metal coated with a soldering flux; then sending the liquid metal and the solid base metal into a gap between two rollers with interior cooling systems; cooling the liquid metal in the gap of the two rollers during rolling to realize the metallurgical bonding between the two kinds of metals to obtain a clad metal sheet.

Figure 2:
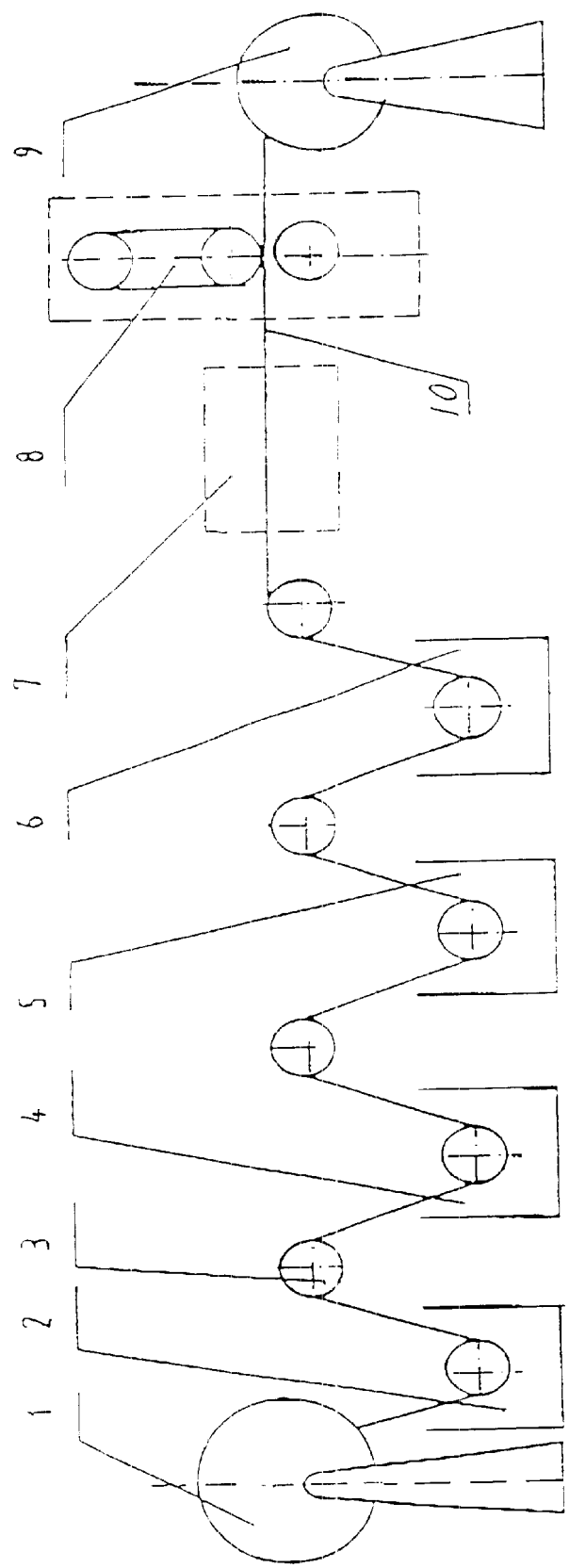
FIG. 2 is the schematic drawing of the cleaning-sanding apparatus adopted by the present invention.

According to the method of the present invention, the cleaning method for the solid metal is well-known by the person skilled in the art. FIG. 2 shows the schematic drawing of a cleaning-sanding apparatus adopted by the present invention. As shown in FIG. 2, the oil stain on the solid base metal is removed from its surface in a degreasing tank 2 and then the solid base metal is cleaned in a washing tank 4. If the surface of the solid base metal is oxidized seriously, it is necessary to wash it with an acid in a pickling tank 5 and then to wash it in a washing tank 6 after step (1). In other words, the pickling tank 5 and the washing tank 6 in the cleaning-sanding apparatus shown by FIG. 2 are alternatively.

It is necessary to remove the oxides existed on the surface of the solid metal to realize liquid-solid rolling bonding of heterogeneous metals. The present invention adopts the cleaning-sanding apparatus shown by FIG. 2 to sand the surface of the solid base metal so as to remove the oxides completely.

According to the method of the present invention, in step (5), the liquid (molten) metal is poured into the pouring nozzle after being melted in a smelter, discharging air and slag. The method for obtaining molten metal is well known by the person skilled in the art.

According to the method of the present invention, it is possible to select different soldering fluxes for different base metals (solid metal) and the bonding material (molten metal) in the clad layer. The soldering flux used in the method is aqua or melting salts.

The aqueous soldering flux of the present invention can be an aqueous solution of a composite salt consisting of KF, NaF, KI, NaI and LiI. The composite salt consists of 15–25% by weight of KF, 15–25% by weight of NaF, 15–25% by weight of KI, 15–25% by weight of NaI, and 15–25% by weight of LiI. Preferably, it consists of, 20% by weight of KF, 20% by weight of NaF, 20% by weight of KI, 20% by weight of NaI, and 20% by weight of LiI. In the aqueous soldering flux, the weight percentage of the composite salt is in the range of 6–12%, preferably in the range of 8–10%.

According to the method of the present invention, the soldering flux can also be a melted composite salt consisting of 60–85% by weight of boric acid, 10–20% by weight of borax, 3–6% by weight of aluminum phosphate. Preferably, it consists of 70–80% by weight of boric acid, 13–18% by weight of borax, and 4–5% by weight of aluminum phosphate. Most preferably, it consists of, 80% by weight of boric acid, 16% by weight of borax, and 4% by weight of aluminum phosphate.

Figure 3:
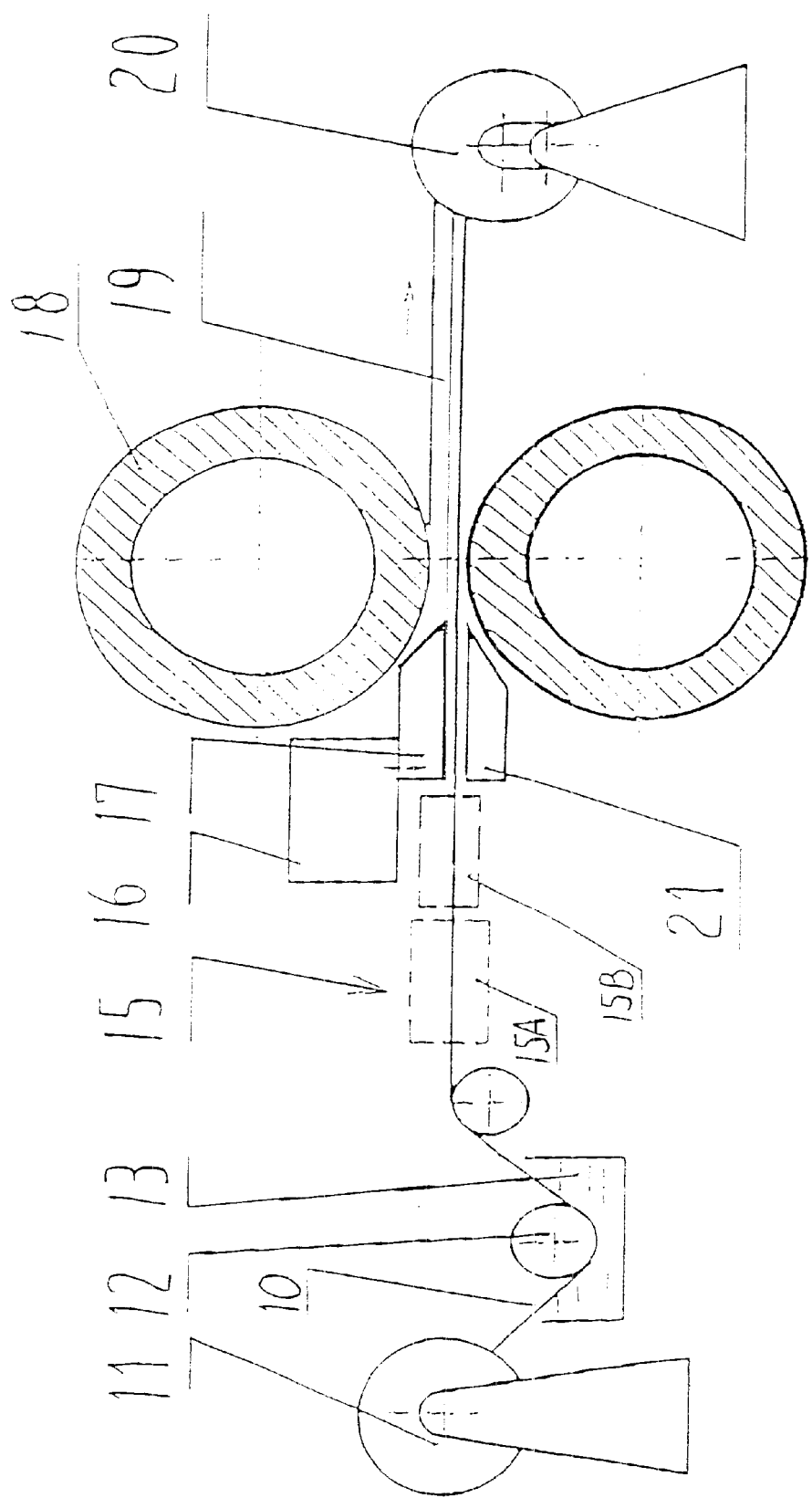
FIG. 3 is the schematic drawing of the rolling bonding apparatus adopted by the present invention.

According to another aspect of the present invention, it provides an apparatus for the liquid-solid rolling bonding of heterogeneous metals. As shown by FIG. 3, the apparatus comprises an unwinding machine 11, a soldering flux tank 13, a drying-heating apparatus 15, a pouring nozzle 17, an interior water-cooling rollers 18 and a roll collecting machine 20 arranged in order. A pouring basket 16 is disposed above the pouring nozzle 17 and a base frame 21 is disposed below the pouring nozzle 17. The drying-heating apparatus 15 further comprises a low-temperature drying furnace 15A and a high-temperature heating furnace 15B.

According to the apparatus for the liquid-solid rolling bonding for different kinds of metals, the pouring nozzle 17, as shown by FIGS. 4 and 5, is a channel-shaped element having press sides 173, heating elements 172, and several press blocks 174 disposed on the surface 171.

According to the apparatus for the liquid-solid rolling bonding for different kinds of metals, the cleaning-sanding apparatus, as show by FIG. 2, comprises an unwinding machine 1, a degreasing tank 2, a washing tank 4, a drying furnace 7, a sander 8 and a roll-collecting machine 9 arranged in order.

According to the apparatus for the liquid-solid rolling bonding for different kinds of metals, a pickling tank 5 and a washing tank 6 are further disposed in the cleaning-sanding apparatus at a position between the washing tank 4 and the drying furnace 7.

The method of the present invention combines the hot dipping and coating of metal with liquid rolling of metals together. According to the method of the present invention, the liquid metal contacts the solid base metal coated with soldering flux, and the soldering flux decomposes at high temperature. Under the function of the soldering flux, the liquid metal fully wets the surface of the solid base metal. It cools down quickly, crystallizes and transforms due to the high diffusion capacity of the liquid metal and the pressure of rolling. In this way, the liquid metal and the solid base metal realize metallurgical bonding to obtain a clad metal sheet.

Wetting is very important to realize metallurgical bonding. The oil stain and the oxides existed on the surface of the solid metal must be removed and the solid metal must be sanded until the real metal is exposed in order to wet the solid metal thoroughly.

In the prior art, the main problem in liquid-solid rolling bonding for different kinds of metals is the serious oxidization in the following heating procedures, which leads to low bonding strength and the metallurgical bonding of two different metals can not be realized. In order to prevent the oxidization on the surface of the solid base metal in the following heating procedures, especially to improve the wetting of the surface of the solid metal by the liquid metal, the present invention adopts a special soldering flux invented by the inventor. By coating the soldering flux of the present invention on the surface of the solid metal after cleaning and sanding, the surface of the solid metal will not oxidized any more in the following heating procedures. Therefore, the metallurgical bonding between the heterogeneous metals is realized and the bonding strength of the two heterogeneous meals is enhanced. According to the base metals and the metals to be clad, it is possible to select different soldering fluxes respectively. The soldering flux can be an aqueous solution or a melted salt.

Figure 6:
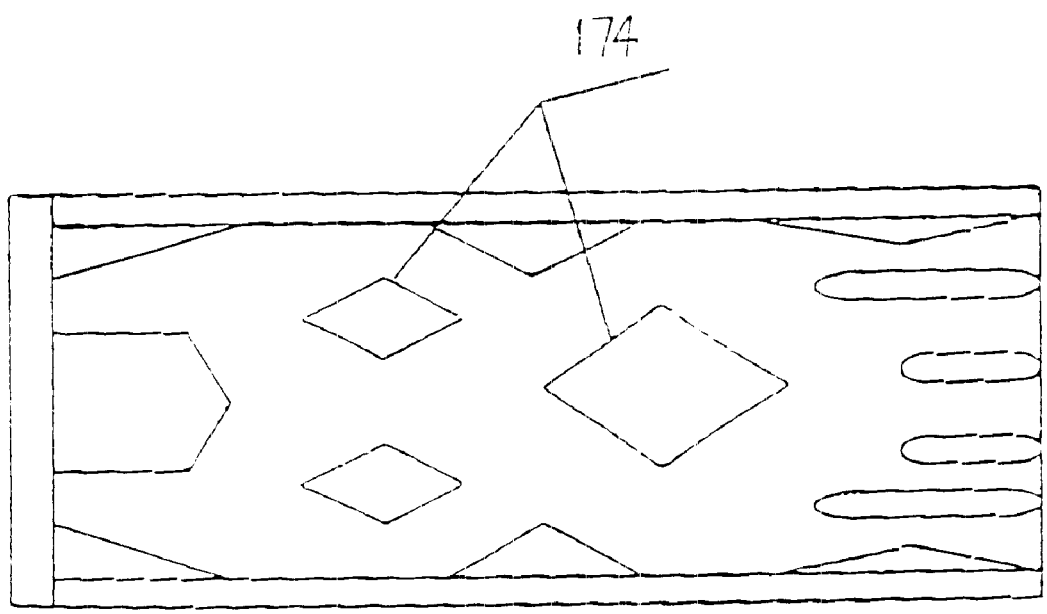
FIG. 6 is another side view of FIG. 4 also from direction A, showing another setting mode of pressing-blocks disposed in the pouring nozzle.

In order to insure the fluidity of the liquid metal, the pouring nozzle 17 should be preheated to a temperature in the range of 20–50° C. higher than the melting point of the liquid metal. The pouring nozzle 17 uses a structural material (such as refractory steel, titanium, ceramics etc.) to form the frame and is coated with a heatproof and refractory material outside. If the solid metal plate is wide and thin, it is possible to warp when it contacts the liquid metal, and the liquid metal at the middle part of the solid metal is hard to be solidified. In order to solve the problem, the inventor of the present invention studied and improved the structure of the pouring nozzle 17 in the solid-liquid rolling bonding apparatus of the present invention. FIG. 4 shows the structure of the pouring nozzle 17 in FIG. 3. FIG. 5 is the side view of FIG. 4 from direction A, showing a setting mode of the pressing blocks in the pouring nozzle 17. FIG. 6 is another side view of FIG. 4 from direction A, showing another setting mode of the press blocks. As shown by FIG. 4, a variety of press blocks 174 are disposed in the pouring nozzle 17. When the solid metal passes through the pouring nozzle 17, it effectively prevents the solid metal from warping and the quantity of the liquid metal flowing through each part of the solid metal can be controlled. Each part of the solid metal plate has the same quantity of the liquid metal per unit area after the liquid metal solidified. Therefore, the obtained clad metal sheet is very flat and has a precise size. During the rolling process, the press blocks 174 scrapes the surface of the solid metal strip which improves the wetting of the surface of the solid metal strip by the liquid metal. Furthermore, as shown by FIGS. 4, 5 and 6, the structure of the pouring nozzle 17 in the liquid-solid rolling bonding apparatus of the present invention is a channel-shaped element. Heating bodies 172 are disposed in the pouring box 17 and pressing blocks 174 are disposed on its interior top surface 171, the surface of the solid metal slides over the underside of the press blocks 175. The press blocks 174 make the liquid metal distribute evenly on the solid base metal 10. An inlet 176 is disposed above the pouring nozzle 17, and the liquid metal in the pouring basket 16 is added to the solid metal through the inlet 176.

In order to insure the fluidity of the liquid metal, the pouring nozzle 17 should be preheated to a temperature in the range of 20–50.degree. C. higher than the melting point of the liquid metal The pouring nozzle 17 uses a structural material (such as refractory steel, titanium, ceramics etc.) to form the frame and is coated with a heatproof and refractory material outside. If the solid metal plate is wide and thin, it is possible to warp when it contacts the liquid metal, and the liquid metal at the middle part of the solid metal is hard to be solidified. In order to solve the problem, the inventor of the present invention studied and improved the structure of the pouring nozzle 17 in the solid-liquid rolling bonding apparatus of the present invention. FIG. 4 shows the structure of the pouring nozzle 17 in FIG. 3. FIG. 5 is the side view of FIG. 4 from direction A, showing a setting mode of the pressing blocks in the pouring nozzle 17. FIG. 6 is another side view of FIG. 4 from direction A, showing another setting mode of the press blocks. As shown by FIG. 4, a variety of press blocks 174 are disposed in the pouring nozzle 17. When the solid metal passes through the pouring nozzle 17, it effectively prevents the solid metal from warping and the quantity of the liquid metal flowing through each part of the solid metal can be controlled. Each part of the solid metal plate has the same quantity of the liquid metal per unit area after the liquid metal solidified. Therefore, the obtained clad metal sheet is very flat and has a precise size. During the rolling process, the press blocks 174 scrapes the surface of the solid metal strip which improves the wetting of the surface of the solid metal strip by the liquid metal. Furthermore, as shown by FIGS. 4, 5 and 6, the structure of the pouring nozzle 17 in the liquid-solid rolling bonding apparatus of the present invention is a channel-shaped element. Heating bodies 172 are disposed in the pouring nozzle 17 and press blocks 174 are disposed on its interior top surface 171, the surface of the solid metal slides over the underside of the press blocks 175. The press blocks 174 make the liquid metal distribute evenly on the solid base metal 10. An inlet 176 is disposed above the pouring nozzle 17, and the liquid metal in the pouring basket 16 is added to the solid metal through the inlet 176.

The method of the present invention can replace the traditional heat or cool rolling bonding to produce a variety of clad metal sheets. It is specially suitable for producing such a clad metal sheet that the melting point of the metal to be clad lower than that of the base metal. For example, steel-aluminum, steel-copper, steel-zinc, steel-lead-tin, steel-alloy steel, copper-aluminum, aluminum-tin etc., as well as the clad metal sheet of the metals having high melting points, such as titanium, nickel, molybdenum etc., with nonferrous metals and their alloy.

The above-mentioned steels can be carbon steel, alloy steel or stainless steel etc.

The present invention will be further described in combination with drawings and examples.

BEST MODES FOR CARRYING OUT THE INVENTION

EXAMPLE 1

304 stainless steel was used as the solid base metal, which was 0.5 mm thick and 300~500 mm wide. Aluminum was used as the metal to be clad. The total thickness of the clad metal sheet was in the range of 0.8~4.0 mm.

As shown by FIG. 1, the solid base metal (namely #304 stainless steel plate) was cleaned firstly. The roll of the solid base metal 10 (namely #304 stainless steel) was put on the unrolling machine 1. The oil stain was removed in the degreasing tank 2. Then it was sent into the washing tank 4 via the bearing rollers 3 to wash. Finally it was sent the drying furnace 7 to dry. If the surface was oxidized seriously, it was further cleaned in the pickling tank 5 and the washing tank 6 before it was sent into the drying furnace 7.

0.005~0.01 mm was sanded off from one side (the side to be clad) of the dried base metal by the abrasive sander 8. After sanding, it was rolled up with the roll-collecting machine 9.

KF, NaF, KI, NaI, and LiI with same amount (by weight) were mixed homogeneously to obtain a composite salt thereof. Distilled water was added to obtain an 8% by weight aqueous solution of the composite salt as the soldering flux. Then, the obtained aqueous solution was added into the soldering flux tank 13 of the apparatus shown by FIG. 3.

The solid base metal 10, which had been processed according to above steps, was sent into a soldering flux tank 13 via the unwinding machine 11 and the press rollers 12 shown by FIG. 3 to coat a layer of the soldering flux on the surface of the solid metal. The temperature of the aqueous solution of the soldering flux in the soldering flux tank 13 was in the range of 80–90° C. and the time for the coating was in the range of 5–10 seconds.

The solid base metal 10 coated with the soldering flux was sent into the drying-heating apparatus 15, which comprised a low-temperature drying furnace 15A and a high-temperature heating furnace 15B, to heat it to a temperature in the range of 200–300° C. Then, it was sent into the pouring nozzle 17. A pouring basket 16 was disposed above the pouring nozzle 17. Solid aluminum was melted in a smelter, and the liquid aluminum was added into the pouring basket 16 after refinery, discharging air and slag. The temperature of the liquid aluminum in the pouring basket 16 was kept in the range of 720–750° C. The speed of feeding was in the range of 2.5–5.5 meters per second.

At the time of sending the solid base metal 10 into the pouring nozzle 17, the liquid aluminum in the pouring basket 16 was added into the pouring nozzle 17 through the inlet 176 to make the liquid metal contact with the surface of the solid base metal 10. The temperature of the pouring nozzle 17 was 20–50° C. higher than the melting point of aluminum. The liquid metal and the solid base metal were sent into the gap of the interior water-cooling rollers 18 to roll. The pouring nozzle 17 was supported by the base frame 21. After rolling bonding by the rollers 18, the clad metal sheet 19 was rolled up by the roll-collecting machine 20.

The mechanical properties of the clad metal sheet obtained in this example were as follows:

Bonding strength: 40~60 Mpa (the thickness was in the range of 2~4 mm)

Tear strength: 1000~1400N/20 mm (the thickness was ≦2 mm)

EXAMPLE 2

08Al mild steel was used as the solid base metal, which was 1.2 mm thick and 100~300 mm wide. Aluminum alloy of Al-20Sn-1Cu was used as the metal to be clad. The total thickness of the clad metal sheet was 2.0 mm.

A clad metal sheet of #08Al mild steel and the aluminum alloy of Al-20Sn-1Cu was produced according to the same procedure as described in Example 1 except that the solid metal was heated to a temperature of 450~550° C. at step (4) and the temperature of the liquid aluminum alloy was in the range of 680~720° C. at step (5). The tear strength of the obtained clad metal sheet was in the range of 800~1100N/20 mm.

EXAMPLE 3

08Al mild steel was used as the solid base metal, which was 2.5 mm thick and 100~300 mm wide. #62 brass was used as the metal to be clad. The total thickness of the clad metal sheet was 3 mm.

A clad metal sheet of #08Al mild steel and the #62 brass was produced according to the same procedure as described in Example 1 except that the solid metal was heated to a temperature of 600° C. at step (4), the temperature of the liquid brass was in the range of 1060~1100° C. at step (5), and a melted composite salt was used as the soldering flux. The melted composite salt was consisted of 80% by weight of boric acid, 16% by weight of borax, and 4% by weight of aluminum phosphate The tear strength of the obtained clad metal sheet was in the range of 1500~1650N/20 mm.

The present invention is further described by the above Examples. It should be understood that any person skilled in the art could amend, revise and improve the present invention without departing from the spirit and essence of the present invention.

ADVANTAGES OF THE INVENTION

The present invention uses a special soldering flux for rolling bonding two heterogeneous metals to realize metallurgical bonding between these two metals. As compared with the prior art the present invention has following advantages:

(1) High bonding strength. According to the method of the present invention, metallurgical bonding between two heterogeneous metals can be realized. According to the present invention, the interface structure of the two metals is very good since temperatures of the liquid metal and the solid base metal and their contact time can be controlled. Therefore, the bonding strength of the clad metal sheet can be increased greatly, usually about 2–3 times of that of the clad metal sheet obtained by the rolling bonding method in solid—solid phase. For example, the bond strength of the clad metal sheet obtained according to the traditional solid—solid rolling bonding method is only in the range of 10~20 Mpa, while that of the clad metal sheet obtained in Example 1 of the present invention is in the range of 40~60 Mpa.

(2) Low production cost. Since fewer processing steps and lower consumption of energy, the production cost for producing a clad metal sheet according to the method of the present invention is 20–30% lower than that for producing a clad metal sheet according to the conventional method in solid—solid phase.

(3) Fewer investment for apparatus. According to the liquid-solid rolling bonding method of the present invention, 50~60% of the liquid metal to be clad in the gap between the two rollers is in the semisolid condition. Therefore, the rolling force can be greatly decreased, only about 25~30% of that needed in the rolling bonding of the metals in solid—solid phase. Furthermore, the procedure of the method of the present invention is relatively simple, and the apparatus for carrying out the method of the present invention is fewer. Therefore, the investment for the apparatus of the present invention is about 50–70% lower than that for the apparatus of rolling-bonding of metals in solid—solid phase of the prior art. For example, in Example 1 of the present invention, the maximum rolling force is 40 tons, and the capability of main motor is 75 KW. If the annual output is 5000 tons, it needs RMB five million for the apparatus. However, a maximum rolling force of 300 tons and a main motor of 250 KW are needed for producing the same clad metal sheet according to the method of the conventional rolling bonding method in solid—solid phase. If the annual output is 5000 tons, it needs RMB fifteen million for the apparatus.

(4) High production efficiency. The rolling bonding method of the present invention can be carried out continuously, and the production efficiency of the present invention is one time or more than two times higher than that of the conventional rolling bonding method in solid—solid phase.

(5) Lower consumption of energy. According to the method of the present invention, the rolling force needed for carrying out the method is 50~75% less than that for carrying out the conventional method in solid—solid phase, and the energy consumption decreases about 30–50%.

(6) High product quality. According to the method of the present invention, the liquid metal cools down rapidly in the gap between two rollers, thus metal crystallizes quickly and its grains are fine, size of heavy metals particles is small, distribution is uniform and density is high. Therefore, the intrinsic metallurgical quality and the external appearance of the product are improved greatly. For example, in Example 2 of the present invention, the average size of the heavy metals, Sn, particles in the clad metal sheet is in the range of 5~15 μm, and distributes uniformly in the clad metal sheet. However, the average size of the aluminum particle in the clad metal sheet made by the conventional rolling bonding method in solid—solid phase is in the range of the average size of the aluminum particle is in the range of 20~25 μm.

Industrial Applicability

The liquid-solid rolling bonding method for heterogeneous metals and apparatus therefor can be widely used to produce various clad metal sheets used in architecture, mechanical industry, cooker and tableware, furniture, chemical industry, decoration, automobile industry, space flight, aviation etc.

What is claimed is:

1. A liquid-solid rolling bonding method for heterogeneous metals, comprising:

pouring a liquid metal onto the surface of a heterogeneous solid base metal coated with a soldering flux;

rolling the liquid metal and the solid metal under pressure; and solidifying the liquid metal to make it bond to the surface of the solid base metal under rapid cooling to realize metallurgical bonding for the two or more metals, wherein the soldering flux is a 6–12% by weight aqueous solution of a composite salt consisting of KF, NaF, KI, NaI and LiI, and the composite salt consists of 15–25% by weight KF, 15–25% by weight NaF, 15–25% by weight KI, 15–25% by weight NaI, and 15–25% by weight LiI.

2. The rolling-compounding method for heterogeneous metals in liquid-solid phases in accordance with claim 1, characterized in that: the soldering flux is an 8–10% by weight aqueous solution of a composite salt consisting of KF, NaF, KI, NaI and LiI, and the composite salt consists of 20% by weight KF, 20% by weight NaF, 20% by weight KI, 20% by weight NaI, and 20% by weight LiI.

3. A liquid-solid rolling bonding method for heterogeneous metals, comprising:

pouring a liquid metal onto the surface of a heterogeneous solid base metal coated with a soldering flux;

rolling the liquid metal and the solid metal under pressure; and solidifying the liquid metal to make it bond to the surface of the solid base metal under rapid cooling to realize metallurgical bonding for the two or more metals, wherein the soldering flux is a melted composite salt, and the composite salt consists of 60–85% by weight boric acid, 10–20% by weight borax, and 3–6% by weight aluminum phosphate.

4. The liquid-solid rolling bonding method for heterogeneous metals in accordance with clam 3, characterized in that: the melted composite salt consists of 70–80% by weight boric acid, 13–18% by weight borax, and 4–5% by weight aluminum phosphate.

5. The liquid-solid rolling bonding method for heterogeneous metals in accordance with clam 4, characterized in that: the melted composite salt consists of 80% by weight boric acid, 16% by weight borax, and 4% by weight aluminum phosphate.

* * * * *